C. B. MITCHELLA.
CLUTCH.
APPLICATION FILED FEB. 12, 1917.
1,257,627.
Patented Feb. 26, 1918.
3 SHEETS—SHEET 1.
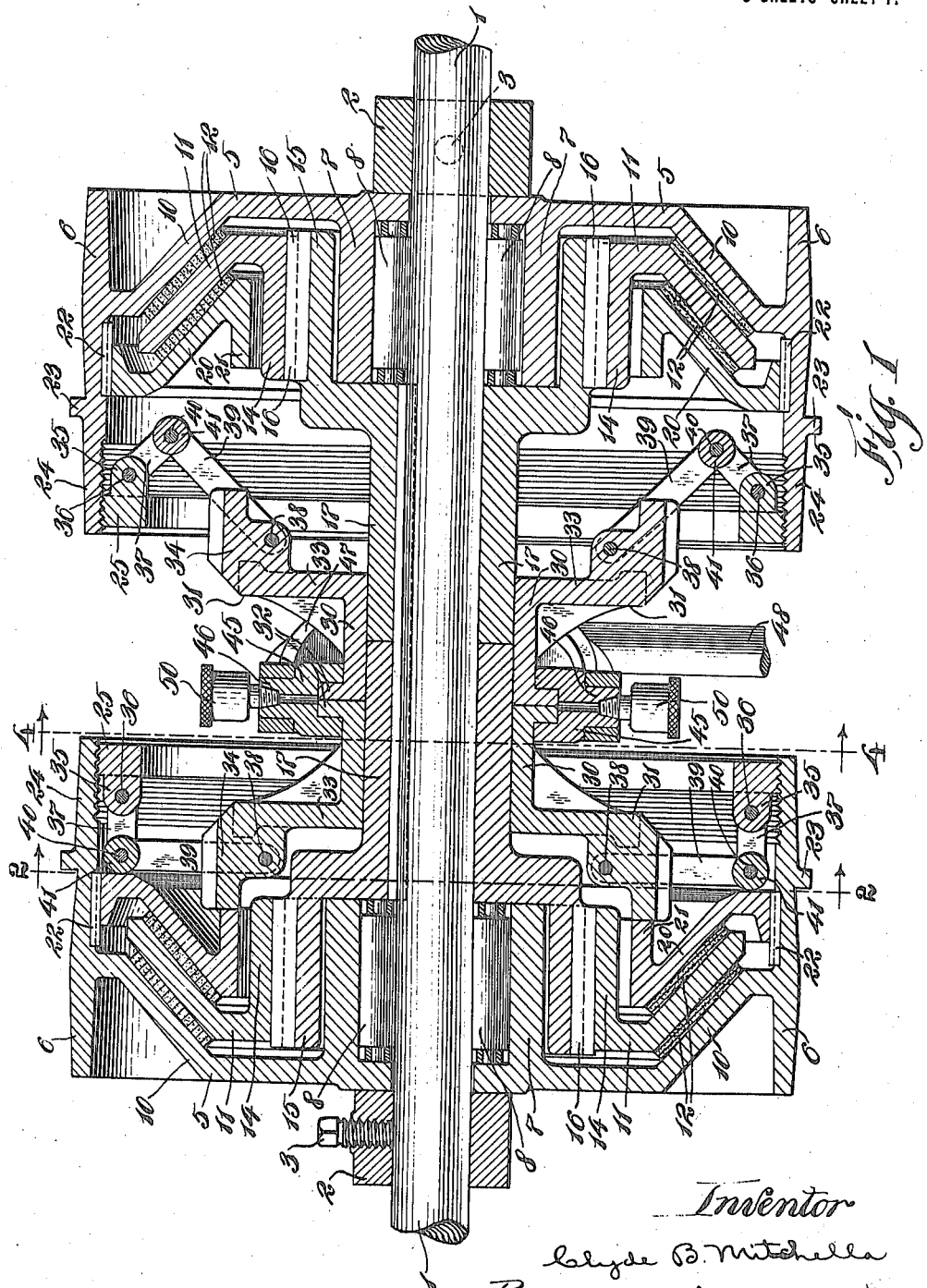

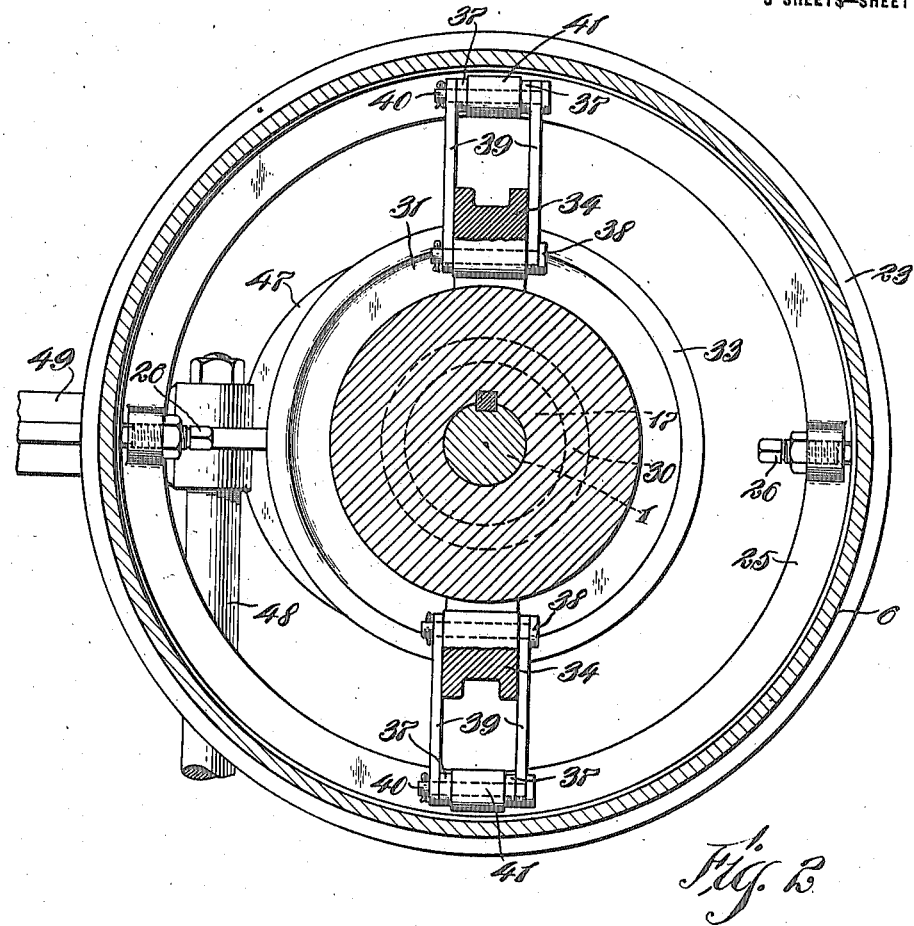
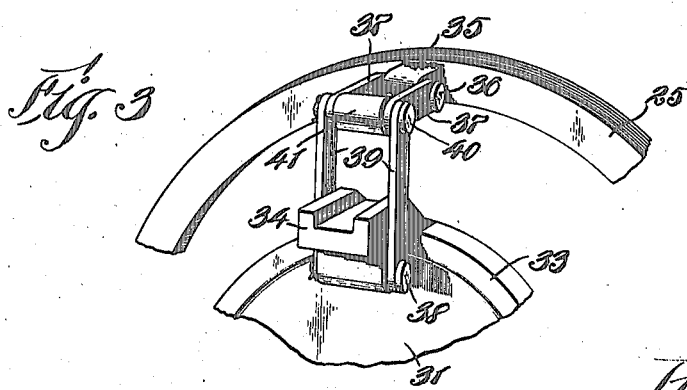

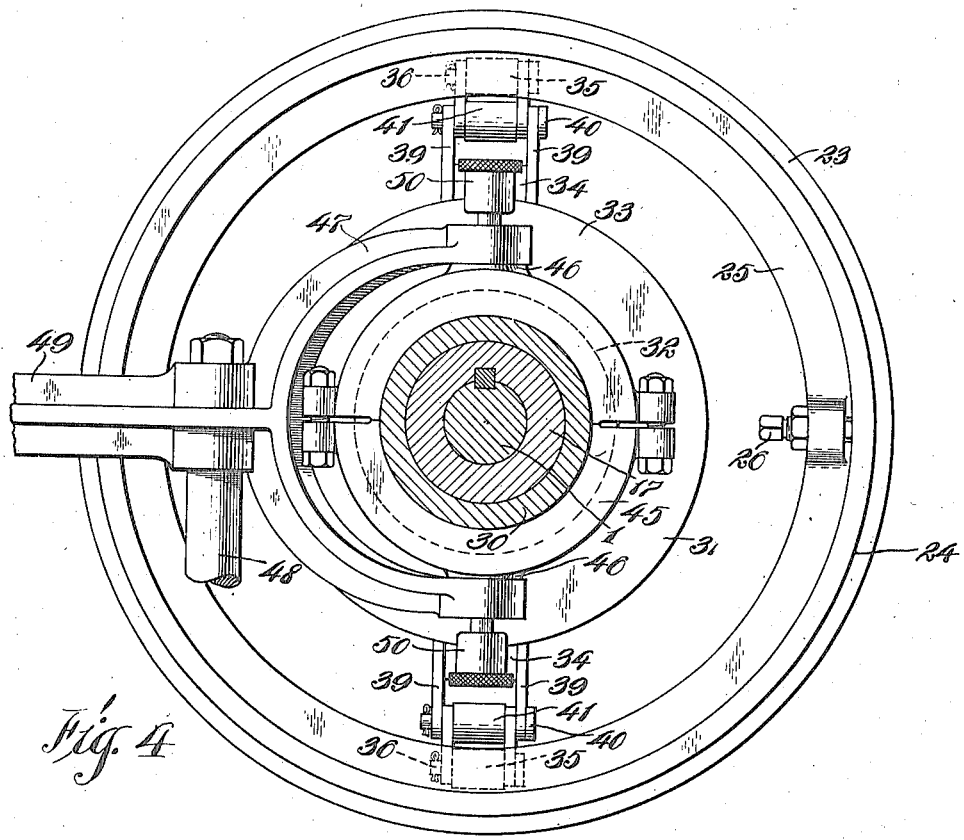
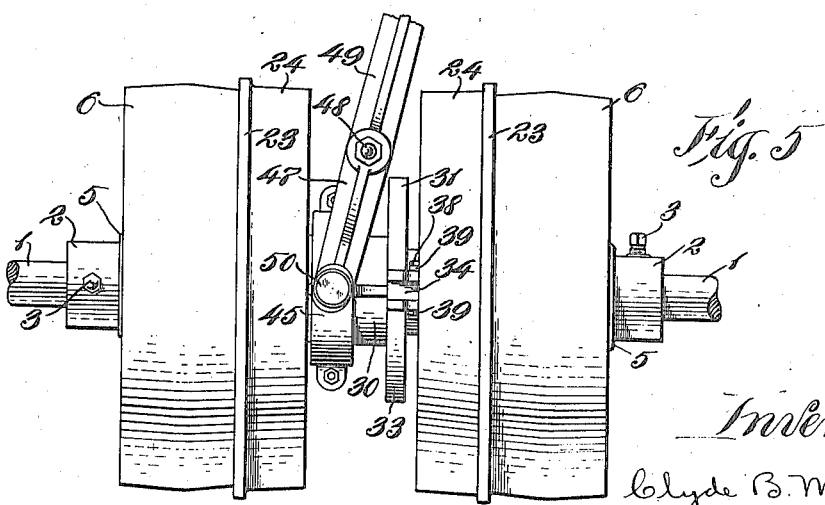

UNITED STATES PATENT OFFICE.

CLYDE B. MITCHELLA, OF AKRON, OHIO, ASSIGNOR TO WILLIAM F. WARDEN, OF CUYAHOGA FALLS, OHIO.

CLUTCH.

1,257,627. Specification of Letters Patent. Patented Feb. 26, 1918.

Application filed February 12, 1917. Serial No. 147,997.

*To all whom it may concern:*

Be it known that I, CLYDE B. MITCHELLA, a citizen of the United States, residing at Akron, in the county of Summit and State of Ohio, have invented a certain new and useful Improvement in Clutches, of which the following is a full, clear, and exact description, reference being had to the accompanying drawings.
This invention relates to improvements in clutches, and while such improvements are adaptable to various types of clutches, I have elected to show them herein as incorporated in a cone clutch of the so-called "dry" variety—that is to say, of the sort which does not require its clutch members to be bathed in oil.

The invention has for its object the production of a highly efficient yet comparatively simple clutch involving an adjustment to compensate for the wear of the engaging faces of the clutch members and which may be easily reached for the purpose of making adjustments without the need of dismantling the clutch or withdrawing the clutch from service.

A further object of the invention is the production of a double clutch which has a single operating lever whereby a driving connection may be obtained between one element and either of two other elements, the nature of the invention assuring in such a double clutch construction the disengagement of one clutch before the other clutch can be rendered effective.

Other objects will become apparent as the structural details of the invention are hereinafter described with reference to the accompanying drawings wherein Figure 1 is a central section through my improved clutch on the center line of the shaft whereon the clutch is mounted; Fig. 2 is a transverse section on line 2—2 of Fig. 1, and looking in the direction of the arrows associated with such line; Fig. 3 is a detail in perspective of the mechanism for moving the clutch members into engagement with each other; Fig. 4 is a section, similar to Fig. 2 on the line 4—4 of Fig. 1; and Fig. 5 is a plan view of the clutch on a reduced scale.

While my invention embraces the double clutch, as shown in the drawings, it will be understood that certain features of the invention are applicable to a single clutch, and as hereinbefore stated, it is not essential that the single clutch be of the design shown in order to be susceptible to the use of my invention.

Describing the embodiment herein illustrated by the use of reference characters, 1 represents a shaft to which there are secured spaced collars 2, the collars being shown as fastened to the shaft by set screws 3. The elements of my clutch are supported upon the shaft between these two collars. Adjacent each collar and adapted to have a thrust bearing thereagainst, is what I shall refer to as the outer clutch member 5, the same being shown as having formed integral with it a pulley 6. The hub 7 of each outer clutch member contains a bearing 8, herein shown as a roller bearing, which bears upon the shaft 1 so that the clutch member is capable of rotating freely thereon. Each outer clutch member is shown as having a conical portion 10, the inner surface of which constitutes the clutch face of the member, and adapted to coöperate with this clutch face is what I shall term the intermediate clutch member 11. This clutch member is of conical formation and has a band 12 of friction material secured to its inner and outer faces. The inwardly extending hub 14 of each of the intermediate clutch members is mounted upon and secured to a hollow cylindrical head 15, by means of a key 16, the cylindrical head extending over the hub 7 of the adjacent outer clutch member. Each cylindrical head is carried by the outer end of a sleeve 17 which is mounted upon and keyed to the shaft 1, the two sleeves 17 occupying the space between the hubs of the outer clutch members and abutting each other at their inner ends.

An inner clutch member 20 of frusto conical formation is slidable within the rim of the pulley 6 and has a clutch face for coöperation with the inner side of the intermediate clutch member, or more accurately stated, with the friction band which is attached to such intermediate member. The inner clutch member is also shown as provided with a hub, the same being spaced radially from the hub 14 of the intermediate clutch member and designated 21. Each inner clutch member is held against rotation with respect to the adjacent outer clutch member by means of a key 22.

The belt receiving portion of each pulley 6 is separated, by a rib 23, from an extension 24 which is internally threaded for the reception of a buttress member 25 which is threaded on its exterior to correspond with the threads of the extension. This buttress member, while being so termed on account of its function, may also be appropriately called "an adjusting ring," for it is by means of this ring that I obtain the adjustment to compensate for the wear of the friction faces. Each adjusting ring or buttress member 25 may be locked in any adjusted position by one or more set screws 26. Two of such set screws are shown associated with each ring, each set screw passing radially through the ring and bearing upon the threads of the pulley extension 24.

Mounted in end-to-end relation upon the sleeves 17 are the hubs 30 of thrust members 31. The thrust members comprise, besides the hubs 30, flanges 32 at their inner ends, and circular plates 33 at their outer ends, the latter being provided, at diametrically opposite points (in the present embodiment), with lugs 34. It will be understood that as many of these lugs as deemed necessary may be employed on each thrust member. Each of the adjusting rings 25 has inwardly extending lugs 35, the number of such lugs corresponding to the number of lugs 34 which are present upon the adjacent thrust member 31. Pivoted upon the ends of a pin 36 which passes through an aperture in each of the lugs 35, are the ends of links 37, and likewise pivoted upon the ends of a pin 38, which extends through each of the lugs 34, are the ends of a pair of links 39. As will be seen particularly from Figs. 2 and 3, the width of each lug 34 is substantially equal to the aggregate thickness of a pair of links 37, and a lug 35, so that when they are brought together the outer ends of the links 39 may overlie the free ends of the links 37. The overlying ends of each of the two pairs of links 37 and 39 are pivotally connected by a pin 40 which has a roller 41 journaled upon it between opposed links.

A split collar 45, of inwardly opening channel formation, embraces the flanges 32 of the thrust members 31, thereby holding them against longitudinal separation, but permitting a free rotation of the parts with respect to each other and the collar. The collar 45 has trunnions 46 which are engaged by the ends of a shifting fork 47, shown as pivoted upon a post 48, and provided with an operating lever 49. A grease cup 50 is threaded into the outer end of a bore of each trunnion for the purpose of supplying a lubricant to the collar.

When the operating lever of the shifting fork is thrown in one direction from its neutral position, in which condition it is shown in the drawings, it moves the thrust members along the sleeves 17. The advancing thrust member will swing the free ends of the links 37, that are connected to the adjusting ring toward which the thrust member is being moved, outward through the intervention of the links 39. As a consequence of this, the rollers 41 are brought into engagement with the rear peripheral portion of the inner clutch member, thereby causing a separation between said clutch member and the buttress member or adjusting ring 25, and the separation of these elements results in a drawing together of the inner and outer clutch members, thereby to clamp between them the intermediate clutch member. Not only is the outer or peripheral portion of the inner clutch member acted upon by the above thrust mechanism, but the inner end of its hub is also engaged by the outer ends of the lugs 34, thereby increasing the effectiveness of the clamping action.

While the above operation is taking place in one clutch, a reverse operation is going on in the other, the lugs 34 of the thrust member of said other clutch withdrawing from the hub of the inner clutch member and the rollers 41 which are associated with said thrust member are removed from the peripheral portion of the inner clutch member, thus permitting the disengagement or relaxing of said other clutch.

When it is desired to adjust the clutch to take up any wear which has occurred in the clutch faces, the screws 26 may be loosened and the rings 25 rotated with respect to the pulleys in an appropriate direction to feed them inward, and by reason of the connections between each ring and the adjacent thrust member through the links 37 and 39, the thrust member will be caused to rotate with the ring.

Having thus described my invention, what I claim is:—

1. In a clutch, the combination with a driving and a driven element, of a pair of clutch members non-rotatable with respect to one element, a clutch member intermediate the former clutch members and non-rotatable with respect to the other element, a buttress member having screw threaded connection with one clutch member of the aforesaid pair whereby it may be moved toward and from the clutch face of said member, means for locking said buttress member in any adjusted position, the other clutch member of the aforesaid pair having an abutment portion that is opposed to the buttress member and having also a second abutment portion, a thrust member movable into engagement with the second abutment portion, and connections between said thrust member and the buttress member which connections are adapted to be moved into operative engagement with the other abutment portion by the movement of the thrust member into engagement with its respective abutment portion.

2. In a clutch, the combination with a driving and a driven element, of a pair of clutch members non-rotatable with respect to one element, a clutch member intermediate the former clutch members and non-rotatable with respect to the other element, a buttress member having screw threaded connection with one clutch member of the aforesaid pair whereby it may be moved toward and from the clutch face of said member, means for locking it in any adjusted position, the other clutch member of the aforesaid pair having an abutment portion that is opposed to the buttress member and having also a second abutment portion, a thrust member movable into engagement with the second abutment portion, links pivoted to the thrust member, links pivoted to the buttress member, the free ends of the links of the two members being pivotally connected and an anti-friction device carried by said links at the point of their pivotal connection and which device is moved into operative engagement with the first abutment portion of the aforesaid clutch member by the movement of the thrust member into engagement with its abutment portion.

3. In mechanism of the character set forth, the combination of a shaft, an abutment thereon, a clutch member adjacent said abutment, a second clutch member slidable toward and from the first clutch member on the side thereof remote from the aforesaid abutment, means for holding said clutch members against relative rotation, a clutch member intermediate the former clutch members, a buttress member connected to the first clutch member and spaced from the side of the second clutch member remote from the first, a thrust member slidable longitudinally of the shaft toward and from the second clutch member, links pivotally connected to the buttress member, links pivotally connected to the thrust member, the free ends of the links of said members being pivotally connnected together, and an antifriction device at the pivotal connection of said links which device is adapted to be moved into operative engagement with the second clutch member when the thrust member is moved in the direction thereof.

4. In mechanism of the character set forth, the combination of a shaft, an abutment thereon, a clutch member adjacent said abutment and rotatable upon the shaft, a pulley carried by and inclosing said clutch member, a second clutch member slidable toward and from the first clutch member on the side thereof remote from the aforesaid abutment, means for holding said clutch members against relative rotation, a clutch member intermediate the former clutch members and non-rotatable with respect to the shaft, an adjusting ring having screw threaded connection with the interior of the pulley and spaced from the side of the second clutch member remote from the first clutch member, a thrust member slidable longitudinally of the shaft toward and from the second clutch member, links pivotally connected to the adjusting ring, links pivotally connected to the thrust member, the free ends of the links of said ring and said member being pivotally connected together, and an antifriction device at the pivotal connection of said links which device is adapted to be moved into operative engagement with the second clutch member when the thrust member is moved in the direction thereof, said thrust member also being arranged for engagement with said second clutch member.

In testimony whereof, I hereunto affix my signature in the presence of two witnesses.

CLYDE B. MITCHELLA.

Witnesses:
 FRED L. MITTLER,
 GEO. H. BURGY.